Oct. 14, 1930. H. D. TAYLOR 1,778,203
MOTOR CAR TRUCK
Filed May 13, 1929 2 Sheets-Sheet 1
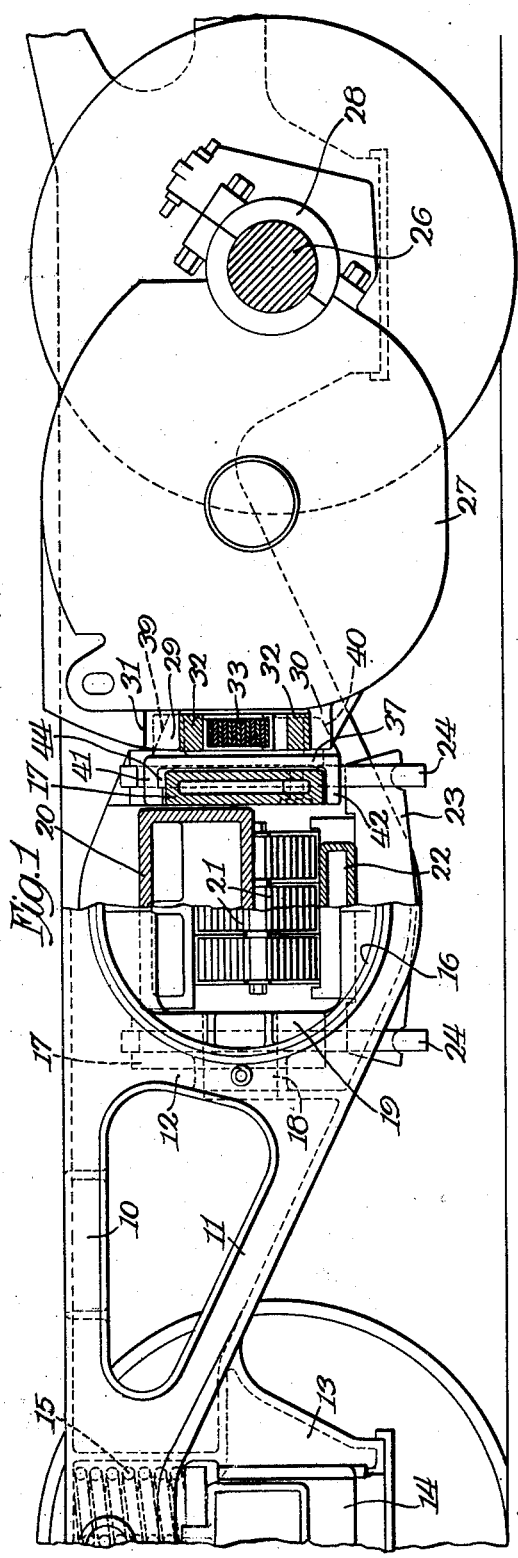
Inventor
Howard D. Taylor
By Fisher, Clapp, Sroufe & Pond Attys Oct. 14, 1930.  H. D. TAYLOR  1,778,203
MOTOR CAR TRUCK
Filed May 13, 1929   2 Sheets-Sheet 2
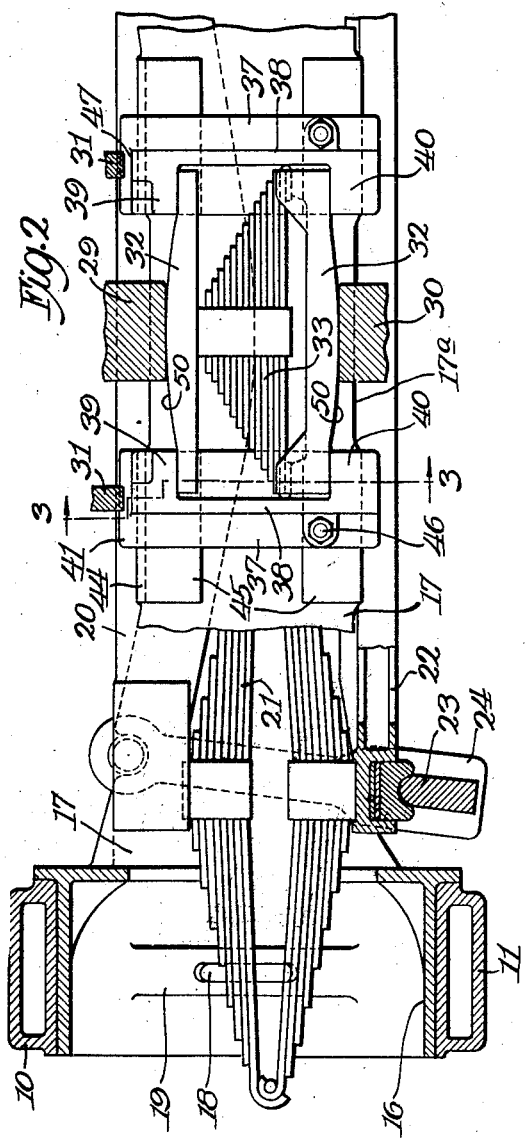
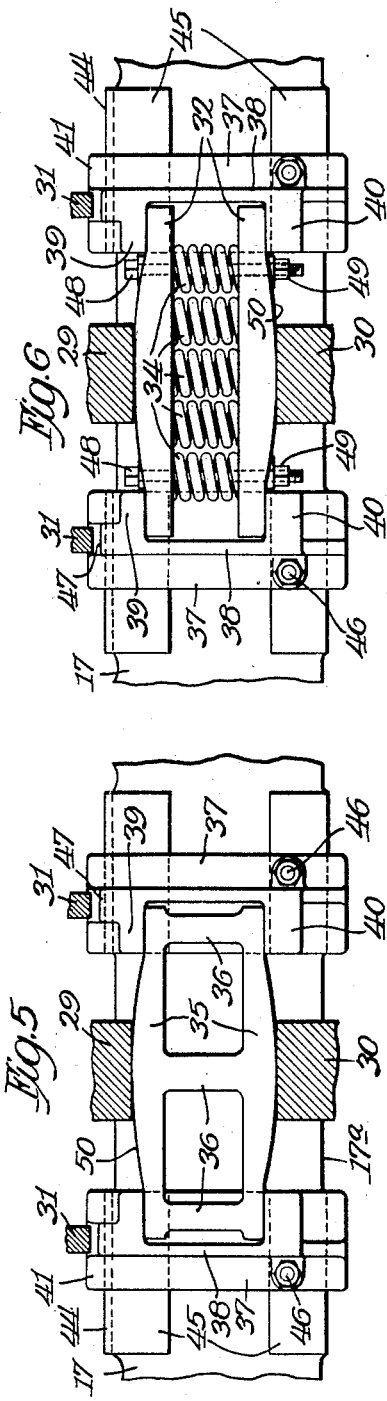
Inventor
Howard D. Taylor
By Fisher, Clapp, Soans & Pond Attys.

Patented Oct. 14, 1930

1,778,203

UNITED STATES PATENT OFFICE

HOWARD D. TAYLOR, OF NEW YORK, N. Y., ASSIGNOR TO FLEXIBLE TRUCK CORPORATION, OF PHILADELPHIA, PENNSYLVANIA, A CORPORATION OF DELAWARE

MOTOR-CAR TRUCK

Application filed May 13, 1929. Serial No. 362,501.

The invention relates to means for supporting the motor frames or casings of motor car trucks, and particularly to the type in which the frame or casing of an electric motor is swivelled at one end on the wheel axle to which the motor is geared, and which is supported at its opposite end by means provided on a transverse member of the truck frame.

The present invention seeks to provide simple and inexpensive means for securely supporting the motor frame upon a transverse member of the truck frame, and which is readily adjustable to permit the vertical movement of the truck frame in opposite directions, without necessitating the removal of other parts of the truck.

The invention consists in the features of improvement hereinafter set forth, illustrated in the preferred forms in the accompanying drawings, and more particularly pointed out in the appended claims.

In the drawings:

Fig. 1 is a view partly in elevation and partly in longitudinal section of a motor car truck with the present improvement applied thereto.

Fig. 2 is a view partly in elevation and partly in transverse section of the central portion of the car truck, and showing the improved motor supporting means in elevation.

Fig. 3 is a detail section on the line 3—3 of Fig. 2.

Fig. 4 is a plan view of the transverse member or transom of the truck on which the motor supporting means is mounted.

Figs. 5 and 6 are detail views similar to Fig. 2, illustrating modifications.

While applicable to other types, the present improvement is shown applied to a car truck in which means is provided for permitting a limited vertical swinging movement of the truck side frames relatively to the transverse connecting member or transom, to avoid shocks in passing over irregularities in the track. As shown, the cast metal side frames of the truck comprise compression and tension members 10 and 11, columns 12 and pedestal jaws 13 for receiving the car axle journal boxes 14, springs 15 being interposed as shown, between the journal boxes and the ends of each side frame. The central portion of each side frame is provided with an enlarged cylindrical bearing opening for receiving end journals 16 of the transverse connecting member or transom of the truck and which comprises spaced side walls 17 integral with the end journals. Keys 18 fixed in suitable seats in the columns 12 of the side frame engage slots formed in stiffening ribs 19 on side portions of the end journals 16 of the transom and interconnect the transom and side frames in a manner permitting the relative swinging movement, to a limited extent, of the side frames. A truck bolster 20, bolster springs 21 and spring plank 22 are disposed between the side walls 17 of the transom, and the spring plank is supported upon cross bars 23 carried by hangers 24 depending from the end portions of the transom side walls. Preferably, as indicated in Fig. 4, the transom side walls are hollow and the hangers 24 depend through openings 25 therein.

An electric motor is mounted on and geared to one of the wheel axles 26 and, if desired, each axle may be provided with a motor. As shown, the motor frame or casing 27 is interposed between the wheel axle and the adjacent side wall 17 of the truck transom and at one end is swivelled on the wheel axle, being removably connected thereto by a suitable axle cap 28. At its opposite end, the motor frame is provided with a nosing which comprises upper and lower centrally disposed jaw lugs 29 and 30 and the motor frame is also provided at its end with spaced safety lugs 31.

A transverse supporting unit is disposed between the jaw lugs 29 and 30 of the motor nosing and brackets mounted on the adjacent side wall of the transom cooperate with the ends of the supporting unit to hold the motor frame in position, these brackets being laterally adjustable on the transom to permit the vertical swinging movement, either up or down, of the motor.

In the forms shown in Figs. 1 to 4 inclusive and in Fig. 6, the supporting unit comprises upper and lower spring bars 32 and an interposed spring or springs. A semi-elliptical leaf spring 33 is shown in Figs. 1 to 4 inclusive, and the form shown in Fig. 6 is provided with a series of spiral springs 34. In the form shown in Fig. 5, the upper and lower bars 35 of the supporting unit are integrally connected by spacing struts 36.

A pair of brackets of like construction are mounted upon the outer face of the adjacent transom side wall 17 and are arranged to engage the end portions of the supporting unit, the brackets being of substantially similar construction for the different units shown in Figs. 2, 5, and 6. The brackets are formed of stout castings and each comprises a base portion 37, an outwardly projecting vertical flange 38 and a pair of upper and lower lugs 39 and 40, the flanges and lugs being integral with the base portion. Each bracket is also provided with upper and lower flanges 41 and 42 which embrace the transom side walls 17 and have a sliding fit thereon. Also, as shown, the upper flange of each bracket and the adjacent edge portion of the transom side wall are provided with interlocking ribs 43 and 44. To facilitate the lateral sliding movement of the brackets on the transom, the base 37 and the adjacent face of the side wall are provided with pads 45 and all of the engaging surfaces of the bracket and transom are machined.

The portions of the transom side wall 17 upon which the brackets slide are of slightly greater height than the relatively contracted central portion 17$^a$, and the supporting brackets can be applied to this contracted central portion and then moved outwardly to effect the interlocking engagement of the ribs 43 and 44 and the sliding fit of the lower flanges 42 of the brackets upon the lower edge of the side wall. Each bracket is secured in operative position on the transom by a bolt 46 extending horizontally through its lower portion and through the adjacent part of the transom side wall.

In the operative positions of the brackets, the supporting unit carried by the motor nosing is disposed between the vertical flanges 38 of the brackets and the bracket lugs 39 and 40 extend over and below the ends of the upper and lower bars respectively of the supporting unit and form seats therefor. The supporting unit is thereby held against displacement and the motor frame is properly sustained. In this position of the brackets, the safety lugs 31 on the motor frame are disposed above but spaced to a slight extent from the integral portions or lugs 47 on the upper portions of the brackets.

By removing the bolts 46, the brackets can be slid further outwardly upon the side wall of the transom to clear the ends of the supporting units and the motor frame can then be either raised or lowered from its normal position to afford access thereto for repairs, or can be readily removed if desired without disassembling other parts of the truck. The upper and lower bars of the supporting units carried by the motor nosing snugly engage the jaw lugs 29 and 30 of the motor nosing and the lugs 39 and 40 of the brackets. To relieve the bracket lugs from pressure and thereby facilitate the lateral adjustment of the brackets to inoperative position, the upper and lower spring bars 32 are preferably connected by bolts 48 having nuts 49 thereon which can be tightened to draw the bars together. When the brackets have been shifted outwardly, the nuts can be again loosened so that the upper and lower bars are again spring-pressed into engagement with the jaw lugs of the motor nosing. As the side frames rock in vertical planes in passing over irregularities in the track, the wheel axles rock to a slight extent in transverse vertical plane. To facilitate this rocking movement of the wheel axle without straining the motor supporting means, the upper and lower bars 32 and 35 of the supporting units carried by the motor nosing are provided with seating faces 50 for the jaw lugs which are convexly curved, as shown in Figs. 2, 5, and 6.

The weight of the motor and the load due to its rotation in one direction is transmitted through the supporting unit to the lower lugs of the brackets, while the load due to the rotation of the motor in the opposite direction is transmitted to the upper bracket lugs. Spring units, such as shown in Figs. 2 and 6, are required for alternating current motors, but a rigid supporting unit, as shown in Fig. 5, can be used with a direct current motor. Obviously, the improved supporting means is readily adapted to either type of motor.

Changes may be made in the details set forth without departure from the scope of the appended claims.

I claim as my invention:

1. In a car truck, the combination with the wheel axle and truck transom, of a motor frame swivelled at one end on the wheel axle and having a projecting nosing at its opposite end, and a bracket carried by the truck member having integral upper and lower projecting lugs adapted to cooperate with said nosing to support the motor frame, said bracket being slidably mounted for lateral adjustment on the face of the truck transom to permit the raising or lowering of the motor frame, substantially as described.

2. In a car truck, the combination with a wheel axle and a transverse truck member, of an interposed motor frame swivelled at one end on the wheel axle and having a projecting nosing adjacent said member, a bracket interlocked with said member and slidably mounted for lateral adjustment thereon into and out of operative position, said bracket having lugs adapted to cooperate with the nosing of the motor frame to support the latter, and means for securing the bracket in operative position substantially as described.

3. In a car truck, the combination with a wheel axle and a transverse truck member, of an interposed motor frame swivelled at one end on the wheel axle and having a projecting nosing adjacent said member, and a pair of brackets slidably mounted for lateral adjustment on the adjacent face of the transverse member and each having integral upper and lower projecting lugs adapted to cooperate with the nosing of the motor frame to prevent or permit the vertical swinging movement of the motor frame in opposite directions, substantially as described.

4. In a car truck, the combination with a wheel axle and a transverse truck member, of an interposed motor frame swivelled at one end on the wheel axle and having a projecting nosing adjacent said member, a pair of brackets detachably interlocked with the transverse truck member and slidably mounted for lateral adjustment on the face thereof into and out of cooperative relation with the motor nosing to prevent or permit the vertical swinging movement of the motor frame, and bolts for securing said brackets in operative position, substantially as described.

5. In a car truck, the combination with the wheel axle and a transverse truck member, of a motor frame swivelled on the wheel axle and having jaw lugs adjacent the transom, a supporting unit disposed between said jaw lugs, and a pair of cooperating supporting brackets mounted on the transverse truck member for lateral adjustment into and out of operative position and provided with pairs of integral lugs disposed above and below the ends of said supporting unit in the operative position of the brackets.

6. In a car truck, the combination with the wheel axle and a transverse truck member, of a motor frame swivelled on the wheel axle and having jaw lugs adjacent the transom, a supporting unit disposed between said jaw lugs, and a pair of cooperating supporting brackets mounted on the transverse truck member having integral flanges and lugs embracing the ends of said supporting unit for holding the same and the motor frame in position, said brackets and the truck member having integral interlocking parts permitting the lateral adjustment of the brackets into and out of operative position.

7. In a car truck, the combination with the wheel axle and the truck transom, of an interposed motor frame swivelled on the wheel axle and having upper and lower jaw lugs adjacent the transom, a transverse supporting unit disposed between said jaw lugs, a pair of supporting brackets mounted on the truck transom and having integral parts engaging the ends of said supporting unit, said brackets being interlocked with the truck transom and laterally adjustable thereon to prevent or permit the vertical swinging movement of the motor frame, and means for securing said brackets in operative position, substantially as described.

8. In a car truck, the combination with the wheel axle and the truck transom, of an interposed motor frame swivelled on the wheel axle and having upper and lower jaw lugs adjacent the transom, a transverse supporting unit disposed between said jaw lugs, and a pair of cooperating brackets detachably interlocked with the truck transom in a manner permitting lateral sliding movements of the brackets into and out of operative position, and said brackets having integral vertical flanges and pairs of projecting lugs disposed, in their operative position of the brackets, adjacent and above and below the ends respectively of said supporting unit, substantially as described.

9. In a car truck, the combination with the wheel axle and the truck transom, of an interposed motor frame swivelled on the wheel axle and having upper and lower jaw lugs adjacent the transom, a transverse supporting unit disposed between said jaw lugs, and comprising upper and lower spring bars and an interposed spring or springs, and a pair of brackets mounted on the truck transom and having pairs of integral lugs forming seats for the ends of the spring bars, said brackets being interlocked with and transversely slidable on the transom to prevent or permit the vertical swinging movement of the motor frame, substantially as described.

10. In a car truck, the combination with the wheel axle and the truck transom, of an interposed motor frame swivelled on the wheel axle and having upper and lower jaw lugs adjacent the transom, a transverse supporting unit disposed between said jaw lugs and comprising upper and lower spring bars, an interposed spring or springs and means for drawing the spring bars together, and a pair of brackets laterally adjustable on the truck transom and having integral seats for the ends of said spring bars, substantially as described.

11. In a motor car truck transom, a truck comprising spaced side walls, a bracket slidable laterally upon the outer face of one of the transom side walls and having flanges overlapping the upper and lower edges of the transom wall and integral projecting motor-supporting lugs, substantially as described.

12. In a motor car truck, a transverse truck member, a bracket having motor supporting lugs mounted on said member and adapted to be interlocked therewith by movement longitudinally thereof and in a manner permitting the lateral adjustment of the bracket into and out of operative position, and means for securing said bracket in operative position, substantially as described.

13. In a motor car truck, a transverse truck member having a contracted portion and a motor supporting bracket having flanges embracing said member, and adapted to be applied to the contracted portion and be interlocked with other portions thereof by a relative movement longitudinally of the member, substantially as described.

14. In a motor car truck, a transom having spaced side walls, and a pair of motor supporting brackets mounted on the outer face of one of the transom walls and having flanges fitting the upper and lower edges thereof, at least one of the flanges of each bracket and the corresponding edge portions of the transom wall having interlocking parts and the transom wall having a contracted central portion to which the bracket can be applied and moved outwardly to engage said interlocking parts, substantially as described.

15. In a motor car truck, side frames, supporting wheel axles, a transverse truck member connected to said side frames in a manner permitting the limited relative rocking movement of said side frames, a motor frame swivelled at one end on a wheel axle and means on the transverse truck member for supporting the opposite end of the motor frame in a manner permitting the relative rocking movement thereof, substantially as described.

16. In a motor car truck, the combination with the wheel axle and the truck transom, of a motor frame swivelled at one end on the wheel axle and having projecting jaw lugs at its opposite end, a transverse supporting unit disposed between said jaw lugs, and cooperating supports adjustably mounted on the truck transom, the contacting faces of the supporting unit and jaw lugs permitting the relative rocking movement thereof, substantially as described.

17. In a motor car truck, the combination with the wheel axle and the truck transom of an interposed motor frame swiveled on the wheel axle and having a projecting nosing and safety lugs adjacent the transom, a transverse, supporting spring unit engaged intermediate its ends by the motor nosing, and a pair of brackets mounted on the outer face of the truck transom and provided with projecting parts, portions of which, in operative position, are disposed below said safety lugs and opposite the ends of the spring unit to hold the latter against horizontal displacement, said projecting parts having other portions forming seats for the ends of the spring unit to hold the same against vertical displacement, and said brackets being laterally adjustable on the transom to permit the unobstructed, vertical swinging movement of the motor frame in opposite direction from its normal position.

18. In a motor car truck, a truck transom comprising spaced side walls of hollow box section, a bracket comprising a base portion and a flange engaged with the outer face and upper edge respectively of one of the transom side walls, said bracket having projecting motor supporting lugs and being laterally adjustable on the transom into and out of operative position, and means for securing the bracket in operative position.

19. In a motor car truck, a truck transom comprising spaced side walls and a pair of motor supporting brackets comprising base portions and flanges slidably engaging the outer face and upper edge respectively of one of the transom walls and adjustable thereon into and out of operative position, the bracket-engaging faces of the transom wall being formed upon raised portions thereof, and means for securing the brackets in operative position.

HOWARD D. TAYLOR.